UNITED STATES PATENT OFFICE.

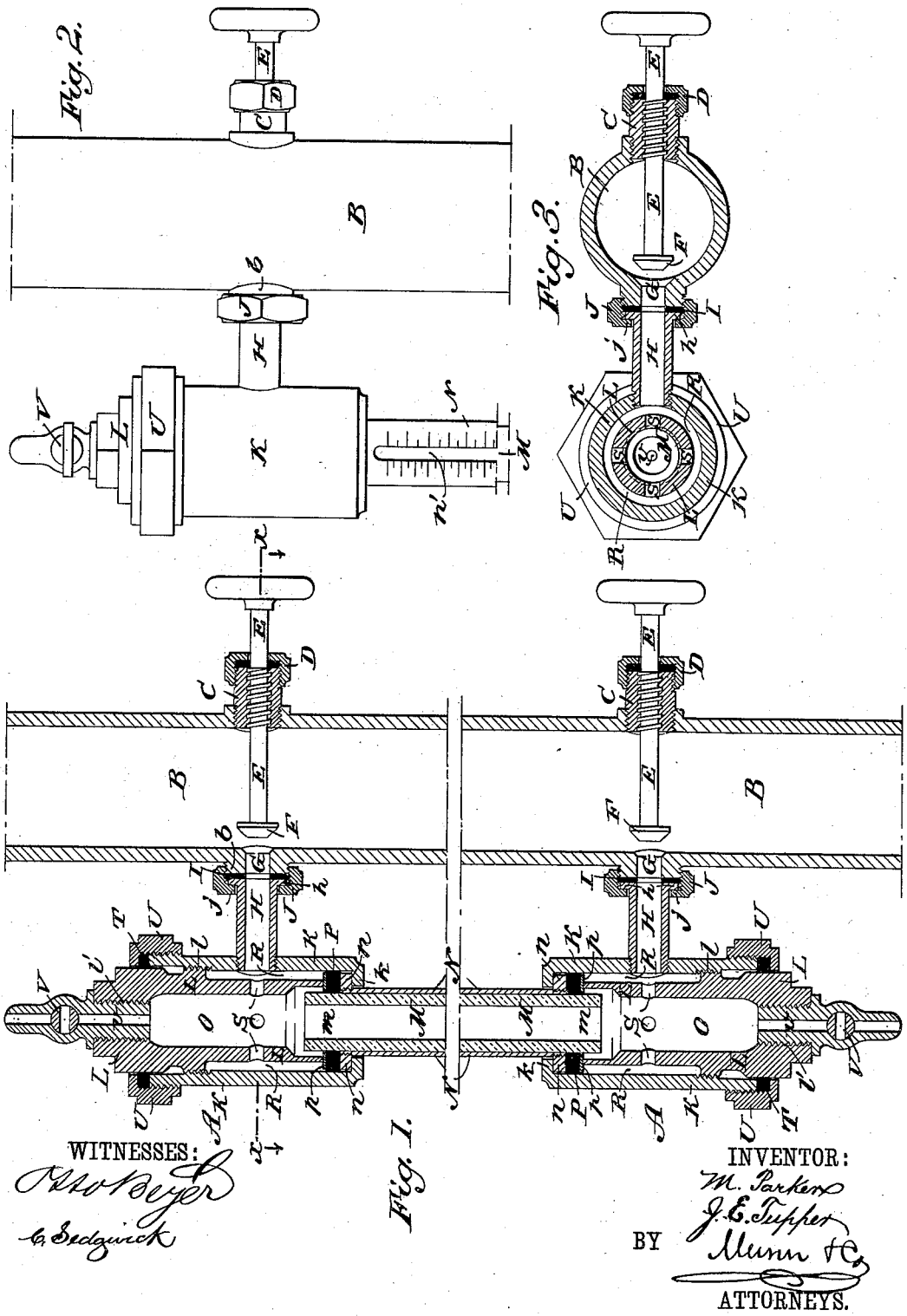

MARSHALL PARKER, OF BARNESVILLE, AND JUDSON EMMETT TUPPER, OF ROTHSAY, MINNESOTA.

WATER-GAGE.

SPECIFICATION forming part of Letters Patent No. 376,255, dated January 10, 1888.

Application filed April 26, 1887. Serial No. 236,250. (No model.)

*To all whom it may concern:*

Be it known that we, MARSHALL PARKER, of Barnesville, Clay county, Minnesota, and JUDSON EMMETT TUPPER, of Rothsay, in the county of Wilkin and State of Minnesota, have invented a new and Improved Water Gage and Column, of which the following is a full, clear, and exact description.

Our invention relates to a water gage and column adapted for connection to steam-boilers or other liquid-heating vessels to test the level of the fluid therein, and has for its object to provide a simple, inexpensive, and efficient device of this character.

The invention consists in certain novel features of construction and combinations of parts of the water gage and column, all as hereinafter described and claimed.

Reference is to be had to the accompanying drawings, forming a part of this specification, in which similar letters of reference indicate corresponding parts in all the figures.

Figure 1 is a vertical sectional elevation of the water gage and column, partly broken away. Fig. 2 is a side elevation of parts of the gage and column, and Fig. 3 is a horizontal section taken on the line $x$ $x$ of Fig. 1.

In the drawings, the letter A indicates the water gage, and the letter B the column, which is a pipe to be connected at its upper and lower ends, respectively, with the steam and water spaces of a boiler.

The arrangement of the end parts or heads of the gage A and their connections with the column B and the arrangement of the valves in the column with relation to the openings to the gage are alike at the top and bottom of the gage; hence a detailed description of these parts at one end of the gage will suffice, as follows: At the back of the column or pipe B is fitted, in a suitable screw plug or nut, C, and stuffing-box D, the stem E of a plug-valve, F, which is within the pipe and is adapted to close a hole or passage, G, made in the front side of the pipe, on which a screw-neck, $b$, is formed or fixed around the passage. A coupling, H, having a flange, $h$, at its inner end, is laid against a suitable packing, I, placed at the outer face of the neck $b$, and a screw-collar, J, having a flange, $j$, overlapping the flange $h$, is turned up tightly onto the neck $b$ to hold the coupling securely to the pipe with a tightly-packed joint. The outer end of the coupling H is screwed into a tapped hole in the side of a short tube, K, which thus has communication through the coupling H with the pipe B when the valve F is open.

The tube K is internally screw-threaded near its outer end, to allow a sleeve or hollow plug, L, to be screwed by corresponding threads at $l$ into the tube, and at the end next the gage-glass M the tube K has an internal flange, $k$, onto which, within the tube, rests an external flange or collar, $n$, which is formed on or fixed to the end of a metal tube, N, which surrounds the gage-glass and forms a jacket to protect the glass from injury, and is slotted at $n'$, to allow the height or level of the water in the glass to be seen and read off by the aid of graduations at the sides of the slot; but these graduations may be dispensed with, if desired. The flanges or collars $n$ on the glass jacket N are preferably screwed onto the ends of the jacket to facilitate assembling the parts of the device. The end $m$ of the gage-glass M projects beyond the end of the jacket N, and within the inner hollow chamber, O, of the sleeve L and around the glass upon the collar or flange $n$ of the jacket is placed a packing, P, onto which or an interposed washer, $p$, the inner end of the sleeve L is screwed down tightly to press the packing to the glass and the jacket-flange $n$.

The inner and outer faces of the tube K and sleeve L are relatively formed to provide between them a passage or annular chamber, R, into which the coupling H opens to establish communication between the pipe B and said passage R, and the wall of the sleeve has a series of apertures, S, establishing communication between the passage R, the pipe B, and the gage-glass M. At the outer end of the tube K is placed around the sleeve L a packing, T, which is pressed snugly to the tube and sleeve by a flanged collar, U, screwed upon the end of the tube.

A petcock, V, having a screw-threaded apertured shank or stem, $v$, is screwed into a tapped hole, $l'$, in the outer end of the sleeve L, and may be opened at any time to test the flow of either steam or water to and through the gage. The sleeve-hole $l'$ is made large enough to allow a suitable swab or device to be passed through it when the petcock is removed and into the gage-glass M for cleaning the glass without otherwise dismembering the gage.

The steam and water from the boiler have free circulation through the passage G, the coupling H, and the passages R S, and chamber O to the interior of the gage-glass M, and, should the glass be broken, the valves F may be quickly closed onto the passages G, to cut off escape of steam and water from the gage and prevent scalding of attendants of the boiler while a new glass is set in place, which may be easily and quickly done by unscrewing the sleeves L from the tubes K, or one sleeve from one tube, and slipping a new glass into the jacket N and readjusting the sleeves or sleeve; or, if preferred, the entire gage may be disconnected from the water column or pipe B by unscrewing the collars I, to allow the new glass to be put in more conveniently in the manner above described, which being done, the valves F may be opened, and the gage is again ready for operation.

Important features of construction and consequent advantages of our water gage and column are as follows: The metal jacket N being nicely fitted and closely clamped to the ends of the tubes K K of the opposite heads of the gage, it is obvious that the heads will always be held in perfect axial alignment with the gage-glass, thus preventing the breakage of the glass, as often occurs by the misalignment of the axes of the heads of gages of this class when under pressure in use.

Providing the passages R, open to the steam or water pressure, and arranging the packings of the gage-glass as above described causes the packings to be forced more closely to the glass by the constant pressure of the steam and water, with a tendency to tighten the packings to absolutely prevent leakage of steam or water around the gage-glass. Furthermore, the sleeve L, forming a clamp to the packing and glass jacket and provided with a removable petcock allowing insertion of a device for cleaning the glass, is a compact and inexpensive construction. It will be understood, however, that a removable plug of any kind may be fitted to the sleeve-head opening $l'$, to allow cleaning of the glass in the manner described.

All parts of the gage may be easily and inexpensively made on the interchangeable-part system, and the external faces of the parts are shaped to be cheaply finished and highly polished, and may be easily kept clean and bright when the gage is in use.

Having thus described our invention, what we claim as new, and desire to secure by Letters Patent, is—

1. In a water-gage, the combination, with its opposite head-pieces each formed with a tube, K, having a flange, $k$, and provided with a sleeve within the tube, of a gage-glass, M, fitted in the opposite tubes K, and a jacket, N, surrounding the glass and provided with flanges or collars $n$, which are clamped to the flanges $k$ of the tubes K by pressure of the sleeves, substantially as herein set forth.

2. A water-gage having opposite heads formed with tubes K, provided with flanges $k$, in combination with a gage-glass, M, entering the tubes, a jacket, N, surrounding the glass and provided with flanges or collars $n$, abutting the tube-flanges $k$, packings P next the flanges $n$, and screw-sleeves L, fitted to the tubes K and pressing on the packings P or interposed washers, $p$, substantially as herein set forth.

3. In a water-gage, its head-piece in which the glass is supported, provided with a steam or water passage opening to the steam or water ways of the gage and column and opening also to a packing held to the head-piece next the gage-glass, substantially as shown and described, whereby the pressure tightens the packing at the joint of the glass with the head-piece, as herein set forth.

4. In a water-gage, its head-piece made with a tube, K, having a flange, $k$, a sleeve, L, formed with a chamber, O, said parts K L relatively formed to provide a passage, R, between them opening to the inlet of the head-piece, and the part L, perforated at S to connect the chamber O and passage R, a glass, M, entering the chamber O, a jacket, N, on the glass and provided with an end flange, $n$, a packing, P, on the jacket-flange $n$, and held thereto by the sleeve L, substantially as described, for the purposes set forth.

MARSHALL PARKER.
JUDSON EMMETT TUPPER.

Witnesses to the signature of M. Parker:
F. H. PETERSON,
FRANK HILL.

Witnesses to the signature of J. E. Tupper:
E. R. PIERCE,
G. M. COWIE.